(12) United States Patent
Bergsten et al.

(10) Patent No.: US 11,971,065 B2
(45) Date of Patent: Apr. 30, 2024

(54) NUT LOCKING SYSTEM AND ELECTRONIC DEVICE COMPRISING SUCH NUT LOCKING SYSTEM

(71) Applicant: Axis AB, Lund (SE)

(72) Inventors: Johan Bergsten, Lund (SE); Ola Andersson, Lund (SE); Christian Jakobsson, Lund (SE); Kim Nordkvist, Lund (SE); Jakob Holmquist, Lund (SE)

(73) Assignee: Axis AB, Lund (SE)

( * ) Notice: Subject to any disclaimer, the term of this patent is extended or adjusted under 35 U.S.C. 154(b) by 519 days.

(21) Appl. No.: 17/206,237

(22) Filed: Mar. 19, 2021

(65) Prior Publication Data
US 2021/0332843 A1 Oct. 28, 2021

(30) Foreign Application Priority Data

Apr. 24, 2020 (EP) ..................................... 20171379

(51) Int. Cl.
*F16B 39/10* (2006.01)
(52) U.S. Cl.
CPC .................................. *F16B 39/10* (2013.01)
(58) Field of Classification Search
CPC .......... F16B 39/10; F16B 39/12; F16B 39/02; F16B 39/28; F16B 39/20; F16B 39/24; F16B 39/00; F16B 39/06; F16B 21/183; F16B 31/02; F16B 37/12; F16B 41/00
USPC ....... 411/191, 927, 517, 518, 197, 198, 204, 411/216, 217, 218, 219, 221
See application file for complete search history.

(56) References Cited

U.S. PATENT DOCUMENTS

| | | | |
|---|---|---|---|
| 2,131,812 A | 10/1938 | Maguire et al. | |
| 2,426,219 A | * 8/1947 | Jackson | .................. F16D 1/096 |
| | | | 411/926 |
| 2,595,787 A | * 5/1952 | Heimann | ................ F16B 21/18 |
| | | | 285/321 |
| 2,813,732 A | 11/1957 | Hird | |

(Continued)

FOREIGN PATENT DOCUMENTS

| DE | 473894 C | 3/1929 |
|---|---|---|
| DE | 721397 C | 6/1942 |

(Continued)

OTHER PUBLICATIONS

Extended European Search Report dated Oct. 7, 2020 for European Patent Application No. 20171379.9.

(Continued)

*Primary Examiner* — William D Hutton, Jr.
*Assistant Examiner* — Carl J Carlson
(74) *Attorney, Agent, or Firm* — Volpe Koenig

(57) ABSTRACT

A nut locking system comprising a nut, a shaft and a retaining ring, wherein the nut is connected to the shaft by means of a threaded joint, the shaft comprising a hollow section in which a body of the retaining ring is arranged, wherein the retaining ring comprises a tongue, the tongue being configured to engage the nut in response to movement of the nut relative the shaft in an axial direction thereof such that movement of the nut is restricted, wherein the tongue comprises a first tongue portion extending over an upper portion of the nut, the first tongue portion being configured to engage with the upper portion of the nut.

12 Claims, 5 Drawing Sheets

(56) References Cited

U.S. PATENT DOCUMENTS

| | | | |
|---|---|---|---|
| 2,898,135 A | 8/1959 | Wurzel | |
| 3,844,323 A | 10/1974 | Anderson, Jr. | |
| 4,398,815 A * | 8/1983 | Barzee .................. | F16M 11/041 |
| | | | 396/419 |
| 2019/0048917 A1 | 2/2019 | Rode | |

FOREIGN PATENT DOCUMENTS

| | | |
|---|---|---|
| DE | 808308 C | 7/1951 |
| DE | 3040267 A1 | 5/1981 |
| JP | 60-059812 U | 4/1985 |
| JP | 62-128213 U | 8/1987 |
| JP | 01-165812 U | 11/1989 |
| JP | 07-038732 U | 7/1995 |
| JP | 3052547 U | 9/1998 |
| JP | 2009-135723 A | 6/2009 |
| KR | 10-1346909 B1 | 1/2014 |
| KR | 102004857 B1 | 7/2019 |

OTHER PUBLICATIONS

Korean Office Action dated Jul. 15, 2022 for Korean Patent Application No. 10-2021-0046352.

Japanese Office Action dated Jul. 26, 2022 for Japanese Patent Application No. 2021-068076.

* cited by examiner

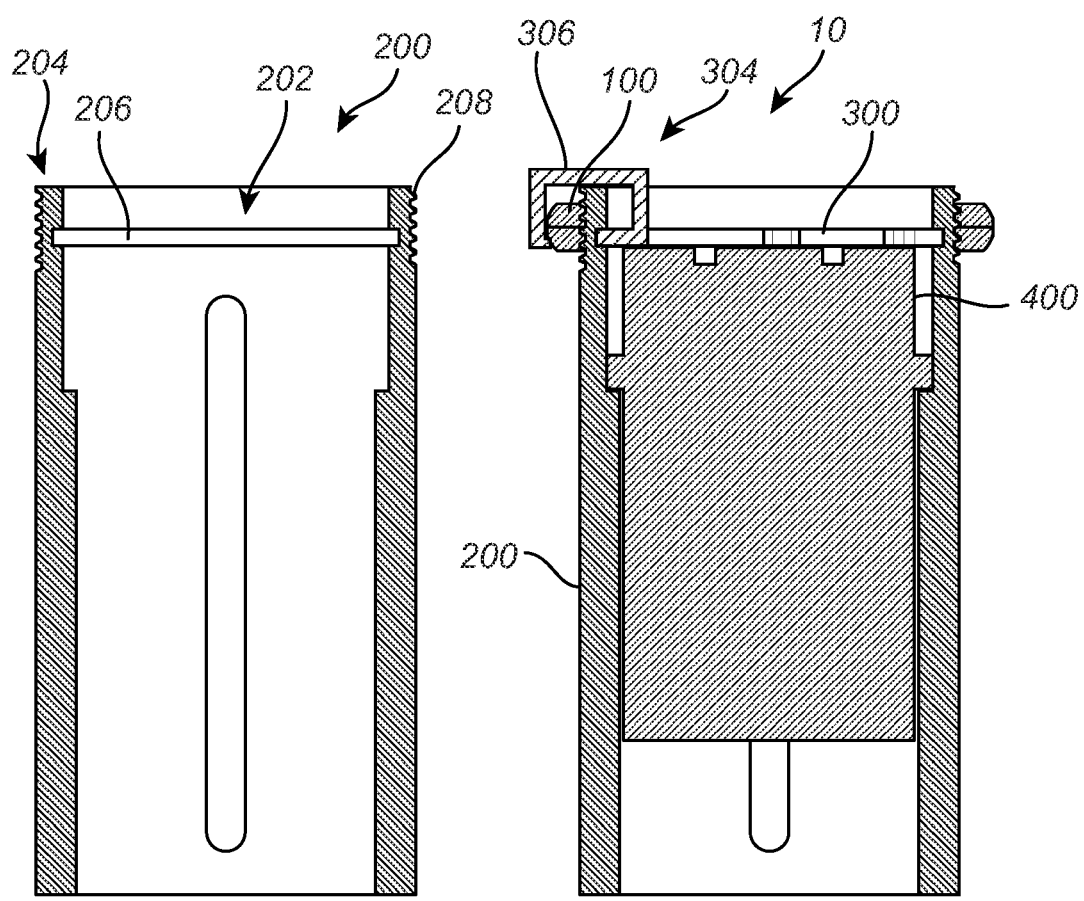

NUT LOCKING SYSTEM AND ELECTRONIC DEVICE COMPRISING SUCH NUT LOCKING SYSTEM

FIELD OF THE INVENTION

The present invention relates to improvements in the safety of mechanical connections, more specifically to a nut locking system for retaining a nut which is attached to a shaft. The present invention further relates to an electronic device comprising a nut locking system.

BACKGROUND ART

Devices, such as for instance surveillance cameras, which are used in areas where people may be present are subject to a number of safety requirements. Such requirements may for instance concern the way that the device is constructed and attached to a support, such as a wall or a ceiling. Certain requirements are dictated by legislation and/or standards, others are informal in nature. Manufacturers of devices such as surveillance cameras constantly strive to not only provide improved safety in their products but also to be able to reduce the size and/or to fit more electronics into the products.

This causes certain problems as, for instance, electronic components require certain isolation spacing between components for ensuring the that the desired function is maintained. This affects not only the electronical components of the device but mechanical components as well, which must be made as robust as possible while also being as compact as possible.

Many types of cameras such as pan-tilt-zoom cameras and dome cameras have large portions of the camera, typically the camera housing, that are moveable in relation to a fixed portion of the camera. In such applications, and especially when the moveable portion of the camera device is arranged hanging from the fixed portion, it is of high importance that the moveable portion is securely attached to the fixed portion.

Prior art solutions have proven to be too space consuming, especially in the context described above.

Related background art can e.g. be found in DE 721397C, DE 808308C, DE 473894C, U.S. Pat. No. 2,131,812A1 and in DE 3040267A1.

SUMMARY

In view of that stated above, providing a nut locking system and an electronic device comprising said nut locking system that alleviates some of the problems with prior art solutions would be beneficial.

To achieve at least one of the above objects and also other objects that will be evident from the following description, a nut locking system having the features defined in claim 1 and an electronic device having the features defined in claim 12 are provided according to the present disclosure. Preferred embodiments will be evident from the dependent claims.

More specifically, there is provided according to a first aspect a nut locking system comprising a nut, a shaft and a retaining ring. The nut is connected to the shaft by means of a threaded joint, the shaft comprising a hollow section in which a body of the retaining ring is arranged. The retaining ring comprises a tongue, the tongue being configured to engage the nut in response to movement of the nut relative the shaft in an axial direction thereof such that movement of the nut is restricted. The retaining ring being mounted internally within the hollow section of the shaft allows improved safety of the connection between the nut and the shaft in a compact manner.

The tongue may further comprise a first tongue portion extending over an upper portion of the nut, the first tongue portion being configured to engage with the upper portion of the nut.

In one embodiment, the body of the retaining ring is a split ring facilitating insertion of the retaining ring into the hollow section of the shaft.

Further still, the body of the retaining ring may be made of a resilient material. The resilience of the retaining ring allows the retaining ring to, in a spring like fashion, return to its original form once mounted in the hollow section of the shaft. Further still, the resilience of the retaining ring may be used to provide a pretensioning force between the shaft and the retaining ring.

The hollow section may in one embodiment be provided with a recess receiving a section of the body of the retaining ring. The recess facilitates that the retaining ring is mounted in the correct position in the hollow section of the shaft and increases the retaining force of the retaining ring.

The recess may further be formed as an annular groove.

The tongue may further comprise a second tongue portion extending in the longitudinal direction of the shaft, interconnecting the body and the first tongue portion.

In one embodiment, the tongue comprises a third tongue portion constituting a distal end section of the tongue, the third tongue portion extends in the longitudinal direction of the shaft and is configured to engage an external side surface of the nut. The third tongue portion reduces the amount of rotation that the nut is allowed before the retaining ring prevents further rotation thereof. The third tongue portion thus further improves the safety of the nut locking system.

The external side surface of the nut may moreover be provided with a groove for reception of the third tongue portion. With the third tongue portion being arranged in a groove in the external side surface of the nut, the retaining ring will be able to withstand a higher force from the rotation of the nut. Further still, the retaining ring, more specifically the tongue thereof, does not have to extend past the diameter of the nut which provides a more compact nut locking system.

The body and the tongue of the retaining ring may in one embodiment be integrally formed.

The threaded joint may comprise an external thread of the shaft and an internal thread of the nut. The nut thus being arranged externally on the shaft while the retaining ring is arranged in the hollow section of the shaft and the tongue of the retaining ring extending such that it restricts axial movement of the nut. The nut locking system thus provides a way of securing a nut which is externally mounted on a shaft by means of a retaining ring that is internally mounted in said shaft, which saves valuable space and improves the safety of the threaded joint.

The body of the retaining ring may be arranged at a distance from an end of said shaft.

In a second aspect of the present disclosure is an electronic device provided. The electronic device comprises a first portion and a second portion. The first portion is attachable to a support and the second portion being attached to the first portion by means of a nut locking system according to the first aspect. The shaft of the nut locking system is associated with the second portion of the electronic device. An electronic device can thus be provided having improved safety and which can be made compact as the nut locking system does not require any additional space in the electronic device.

The electronic device may further be a camera device, the second portion being a camera portion rotatably attached to the first portion. Camera devices, especially such used in surveillance, are likely to be arranged in areas where many people are present. It is critical that the camera portion cannot be unintentionally detached from the first portion as this may result in the camera portion falling and in a worst case scenario causing injury to a person situated below the camera device. The teachings herein reduce the likelihood that the nut unwinds from the shaft and thus releases the camera portion from the first portion. Further still, even if the nut for some reason is unwound from the shaft, the nut locking system will still, by the provision of the retaining ring, remain attached to the first portion. A camera device having improved safety without having to compromise the size of the camera device is thus provided.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages will be better understood through the following illustrative and non-limiting detailed description of preferred embodiments, with reference to the appended drawings, where the same reference numerals will be used for similar elements, wherein:

FIG. 7 discloses a cross-sectioned view of a shaft for a nut locking system.

FIG. 8 discloses a cross-sectioned view of a nut locking system.

DESCRIPTION OF EMBODIMENTS

The present teachings will now be described more fully hereinafter with reference to the accompanying drawings, in which currently preferred embodiments are shown. The teachings may, however, be embodied in many different forms and should not be construed as limited to the embodiments set forth herein; rather, these embodiments are provided for thoroughness and completeness, and fully convey the scope of the claims to the skilled person.

Figure 1:
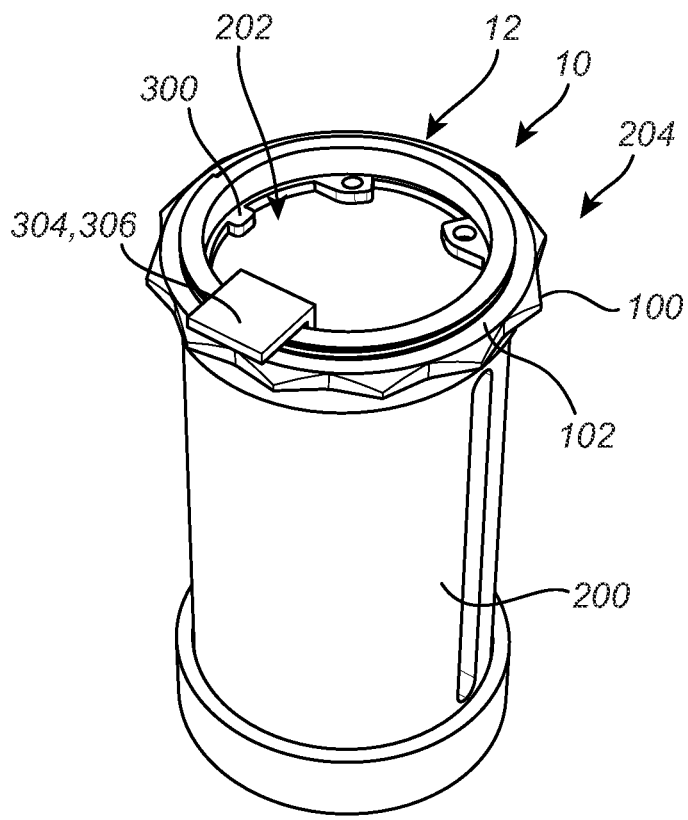
FIG. 1 discloses a perspective view of a nut locking system.

FIG. 1 shows a perspective view of a nut locking system 10. The nut locking system 10 is configured to improve the safety of a connection between a nut 100 and a shaft 200. The nut 100 will be further explained in relation to FIGS. 5 and 6 below. The nut 100 is connected to the shaft 200 by means of a threaded joint 12, preferably formed by an external thread 208 on the peripheral surface of the shaft 200 and an internal thread on the nut 100. The nut 100 may be attached near an end 204 of the shaft 200. Such an arrangement prevents that any external retaining ring can be attached between the nut 100 and the end 204 of the shaft 200.

The shaft 200 comprises a hollow section 202, formed internally in the shaft 200. In one embodiment, the hollow section 202 extends the entire length of the shaft 200 thus forming a shaft having an annular cross sectional shape. The hollow section 202 does however not have to extend the entire length of the shaft 200.

The nut locking system 10 of the present disclosure further comprises a retaining ring 300 having a body 302 which is configured to be arranged in the hollow section 202 of the shaft 200. The nut 200 can thus be attached as close to the end 204 of the shaft 200 as possible or even protruding past the end 204 of the shaft 200, as the retaining ring 300 according to the teachings herein is only attached inside of the hollow section 202 of the shaft 200 and will thus not compete for space on the outside of the shaft 200 with the nut 100.

Figure 2:
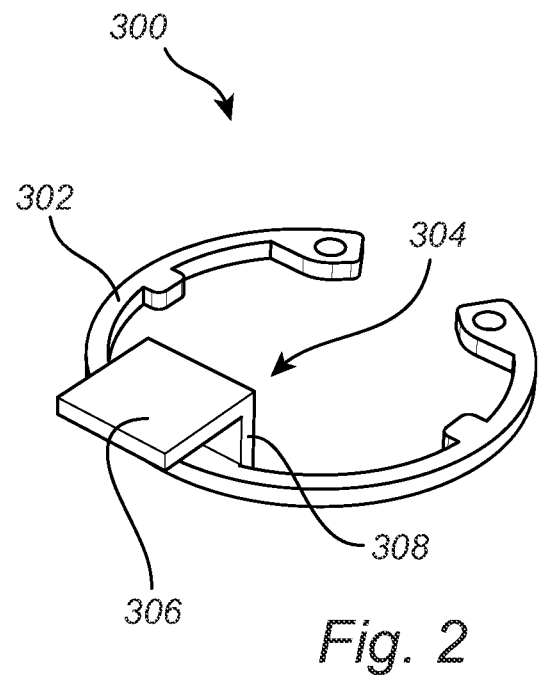
FIG. 2 discloses a perspective view of a retaining ring for a nut locking system.

The retaining ring 300, which is shown in detail in FIG. 2, comprises a tongue 304. The tongue 304 is configured to engage the nut 100 if the nut 100 for some reason becomes loose and starts unwinding itself and moves in an axial direction of the shaft 200.

Preferably, as is shown in the embodiment in FIGS. 1 and 2, the tongue 304 is provided with a first tongue portion 306 that extends over an upper portion 102 of the nut 100. The upper portion 102 is a surface on the nut 100 that faces in the same direction as the end 204 of the shaft 200.

The first tongue portion 306 will engage the upper portion 102 of the nut 100 if the nut 100 starts unwinding itself on the shaft 200. The movement of the nut 100 in the axial direction of the shaft 200 will thus be limited/restricted by the interaction between the retaining ring 300 and the nut 100. The first tongue portion 306 should preferably extend essentially perpendicularly to the axial direction of the shaft 200 but it is to be realized that it could also be arranged at other angles in relation to the axial direction of the shaft 200 as well. In a preferred embodiment, the first tongue portion 306 has a flat shape that is arranged parallel to but vertically offset, i.e. offset in the axial direction of the shaft 200, from the plane in which the body 302 of the retaining ring 300 is arranged. The body 302 of the retaining ring 300 can thus be arranged in the hollow section 202 of the shaft 200 at a distance from the end 204 thereof.

However, the first tongue portion 306 may in one embodiment (not shown) be arranged in the plane of the body 302 of the retaining ring 300. In this embodiment, the first tongue portion 306 is configured to extend from the body 302 through a hole in the shaft 200 which is arranged between the nut 100 and the end 204 of the shaft 200 such that is arranged above an upper portion 102 of the nut 100.

Preferably, the retaining ring 300, or more specifically the body 302 thereof, is formed as a split ring which allows it to be compressed to fit into the hollow section 202 of the shaft 200. The retaining ring 300 is further preferably made from a resilient material such as steel, preferably spring steel, but also other materials are considered such as other metallic materials, composite materials and polymeric materials such as plastic etc. The resilience of the retaining ring 300 allows it to flex when inserted and then return to its original shape, preferably such that it provides a certain pretensioning force to the inside of the shaft 200 which increases friction between the retaining ring 300 and the shaft 200. This not only improves the retaining functionality of the retaining ring 300 but may further be beneficial in terms of avoiding any undesired noises that may arise if the retaining ring 300 is fitted to loosely to the shaft 200.

The tongue 304 of the retaining ring 300 may further comprise a second tongue portion 308 extending in the longitudinal direction of the shaft 200, interconnecting the body 302 and the first tongue portion 306. In a preferred embodiment, the body 302 and the tongue 304 are integrally formed, for instance by stamping and/or a bending manufacturing operation.

Figure 4:
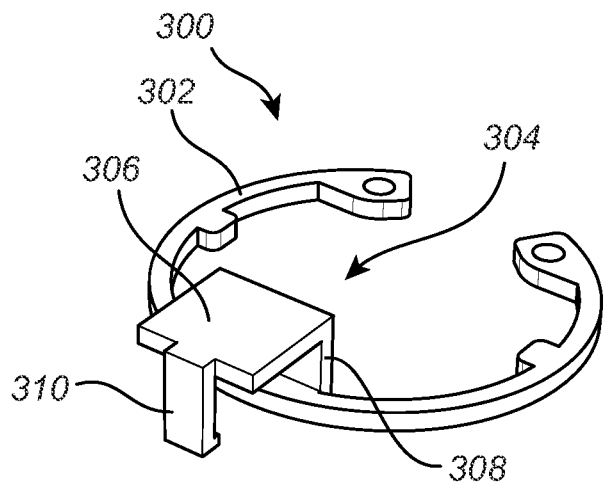
FIG. 4 discloses a perspective view of a retaining ring for a nut locking system.
Figure 3:
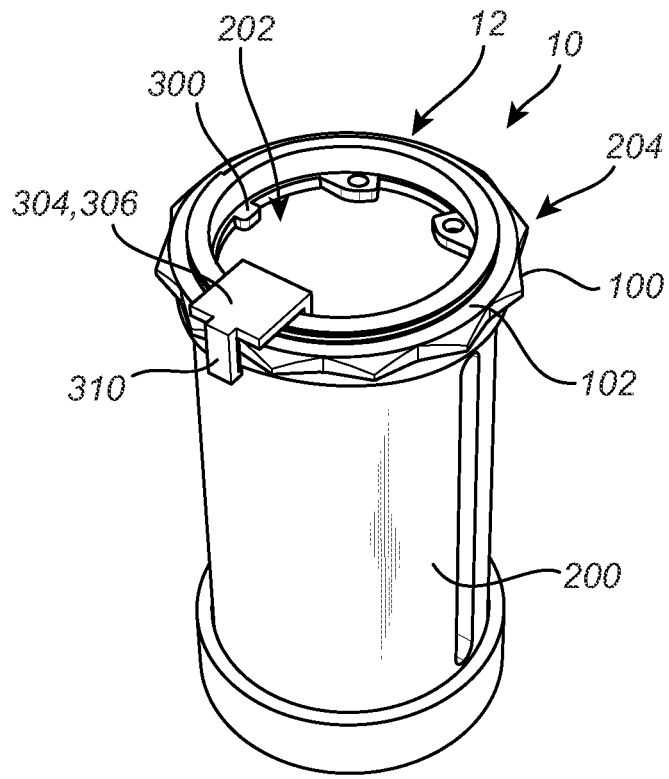
FIG. 3 discloses a perspective view of a nut locking system.

FIGS. 3 and 4 shows yet another embodiment of the nut locking system 10. The embodiment shown in FIGS. 3 and 4 share most features with the embodiment shown in FIGS. 1 and 2 and emphasis below will thus be made only on the differing features.

The retaining ring 300 in the embodiment shown in FIGS. 3 and 4 further comprises a third tongue portion 310 constituting a distal end section of the tongue 304. The third tongue portion 310 extends in the longitudinal direction of the shaft 200 and is configured to engage an external side surface 104 of the nut 100. The third tongue portion 310 preferably extends from the first tongue portion 306. The tongue 304 in the embodiment shown in FIGS. 3 and 4 is thus essentially U-shaped, having an extension from the body 302, which is in the hollow section 202 of the shaft 200, around and over the end 204 of the shaft 200, to a radially external side of the nut 100.

Figure 5A:
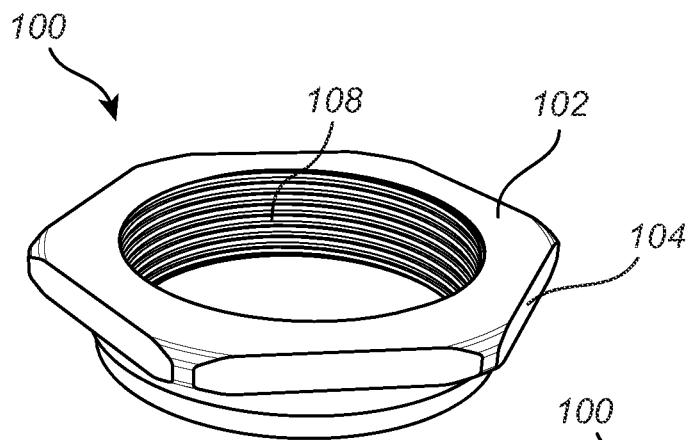
FIG. 5A discloses a perspective view of a hexagonal nut for a nut locking system according to one embodiment.
Figure 5B:
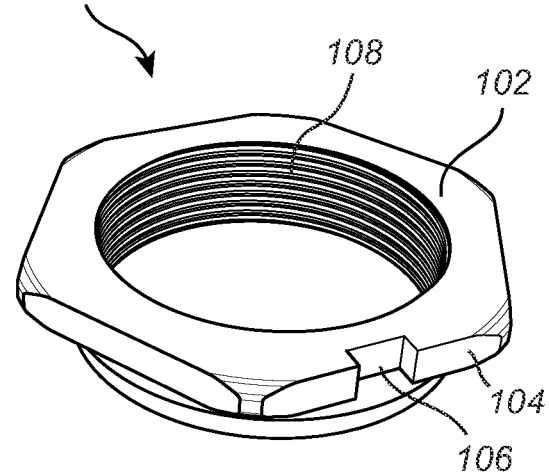
FIG. 5B discloses a perspective view of a hexagonal nut for a nut locking system according to one embodiment.
Figure 6A:
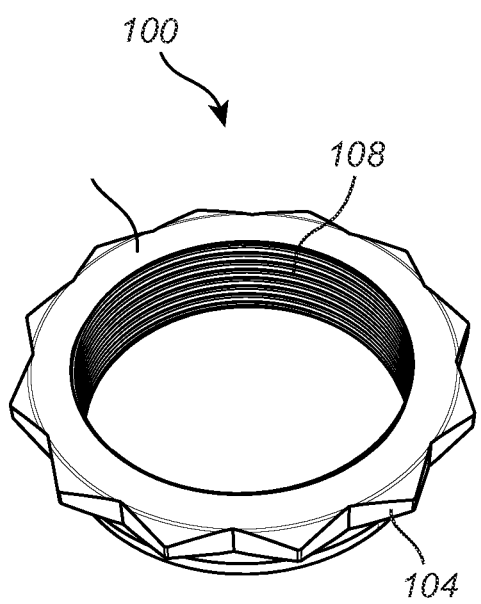
FIG. 6A discloses a perspective view of a 12-pointed nut for a nut locking system according to one embodiment.
Figure 6B:
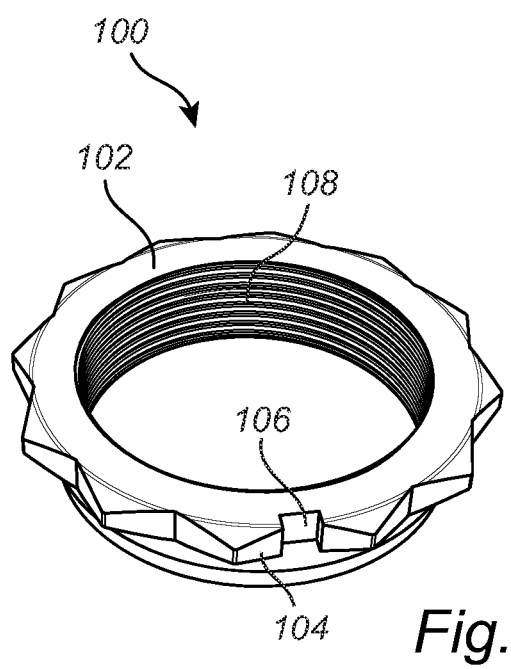
FIG. 6B discloses a perspective view of a 12-pointed nut for a nut locking system according to one embodiment.

The third tongue portion 310 is preferably arranged near or in contact with the external side surface 104 of the nut 100 when the nut locking system 10 is in its assembled state, i.e. when the nut 100 and the retaining ring 300 are both attached to the shaft 200. The external side surface 104 preferably being one of the side surfaces on a hexagonal nut as shown in FIG. 5A or 5B, or one of the side surfaces on a 12-pointed nut as shown in FIG. 6A or 6B. When the nut 100 is rotated, it will, if not already in contact with, come into contact with the third tongue portion 310. Less movement of the nut 100 is thus allowed, as the nut 100 only is allowed to rotate a small distance before the third tongue portion 310 prevents further rotation. For instance, when the threaded connection between the nut 100 and the shaft 200 has a small pitch, i.e. when a relatively large rotation of the nut 100 is needed for a providing a certain axial movement thereof, the third tongue portion 310 may prevent rotation of the nut 100 before it has achieved any significant axial movement. The first tongue portion 306 may complement the third tongue portion 310, such that if the third tongue portion 310 for some reason fails to stop the movement of the nut 100, the first tongue portion 306 will also engage the nut 100 adding to the retaining functionality of the retaining ring 300.

The force from the nut 100 on the third tongue portion 310, as it is arranged to come into contact with an external side surface 104 of the nut 100, will generate an increased frictional force between the retaining ring 300 and the shaft 200 which increases the retaining force from the retaining ring 300 in a self-locking manner. This will also occur when the nut 100 engages the first tongue portion 306.

FIG. 5A shows a conventional hexagonal nut 100 having an internal thread 108 for cooperation with an external thread 208 provided on the shaft 200 (shown in FIG. 7), thus forming the threaded joint 12. The nut 100 comprises six external side surfaces 104 and an upper portion 102. FIG. 5B shows another embodiment of the hexagonal nut 100 in which the nut 100 is provided with a groove 106 arranged on one or several of the external side surfaces 104 of the nut 100. The groove 106 on the nut 100 is configured to receive the third tongue portion 310, which for the purpose may have a smaller width than the remaining first and second tongue portions 306, 308. The groove 106 may be formed by a vertical rectangular notch and/or by a recess in the external side surface 104 of the nut 100. The nut 100 may as mentioned be provided with several grooves 106, for instance on each of its external side surfaces 104 or every second external side surface 104 or be provided with more than one groove 106 on each external side surface 104.

In FIG. 6A is another embodiment of the nut 100 for the nut locking system 10 shown. The nut 100 of FIG. 6A is a 12-pointed nut, which further facilitates reducing the lateral protrusion, i.e. the diameter, of the nut 100 from/around the shaft 200. The 12-pointed nut 100 thus comprises external side surfaces 104 and an upper portion 102. The nut 100 further comprises an internal thread 108 arranged to cooperate with an external thread 208 on the shaft 200 (shown in FIG. 7) thus forming the threaded joint 12. Moreover, as is shown in the preferred embodiment of FIG. 6B, the 12-pointed nut 100 may be provided with a groove 106 arranged on one or several of the external side surfaces 104 of the nut 100.

The groove 106 on the nut 100 is, as in the embodiment shown in FIG. 5B, configured to receive the third tongue portion 310, which for the purpose may have a smaller width than the remaining tongue portions 306, 308. The groove 106 may be formed a vertical rectangular notch and/or by a recess in the external side surface 104 of the nut 100. The nut 100 may further be provided with several grooves 106, for instance on each of its external side surfaces 104 or every second external side surface 104 or be provided with more than one groove 106 on each external side surface 104.

The third tongue portion 310 will by its interaction with the groove 106 in the nut 100 provide an additional locking force to the nut locking system 10. Further still, by the provision of the nut locking system 10 according to the teachings herein, the retaining ring 300 does not protrude laterally or externally of the nut 100 which is beneficial in terms of providing a more compact nut locking system 10. The groove 106 in the nut 100 further facilitates arranging the third tongue portion 310 of the tongue 304 externally on the nut 100, while still not protruding past the outer diameter of the nut 100. Further still, the nut locking system 10 provided herein allows that a nut 100 mounted externally on a shaft 200 may be retained by a retaining ring 300 mounted internally in a hollow section 202 in said shaft, which as mentioned above means that the peripheral surface on the shaft 200 does not have to be provided with space between the nut 100 and the end 204 of the shaft 200 for attachment of a retaining ring.

Further still, the number of sides on the nut 100 are not limited to 6 or 12, the teachings herein are applicable to any type of nut 100 having any number of sides or even having an entirely round or oval peripheral external side surface 104.

In FIG. 7, the shaft 200 can be seen in a cross-sectioned view. The shaft 200, as mentioned, comprises a hollow section 202 into which the body 302 of the retaining ring 300 is configured to be arranged. To facilitate mounting of the retaining ring 300 in the hollow section 202 of the shaft 200, the hollow section 202 may be provided with a recess 206 for receiving a section of the body 302 of the retaining ring 300. The recess 206 is intended to hold the retaining ring 300 in its desired position in relation to the shaft 200 and to improve the retaining force of the nut locking system 10. The recess 206 may be formed in many different ways, for instance by a step where the portion of the hollow section 202 of the shaft 200 closest to the end 204 of said shaft has a smaller internal diameter than an adjacent portion of the hollow section 202 arranger farther from the end 204. The recess 206 in the shape of a step will prevent the body 302 of the retaining ring 300 to move towards the end 204 of the shaft 200 past the step 206, while the tongue 304 or more specifically the first tongue portion 306 will prevent movement of the retaining ring 300 away from the end 204 of the shaft 200.

In a preferred embodiment, the recess 206 is an annular groove 206. The annular groove 206 will restrict movement of the retaining ring 300 in relation to the shaft 200 in the directions both toward and away from the end 204 thereof.

The annular groove 206 is formed in the hollow section 202 at a predetermined distance from the end 204 of the shaft 200, preferably such that the retaining ring 300 when mounted thereto will be arranged with the first tongue portion 306 being arranged over an upper portion 102 of the nut 100. The first tongue portion 306 should preferably have an exension in relation to the radial direction of the shaft 200 such that it does not extend past the outer, i.e. the largest diameter, of the nut 100.

In a preferred embodiment, the first portion 306 of the retaining ring 300 is arranged adjacent to, or in abutment with, the end 204 of the shaft 200 when the body 302 is arranged in the recess 206 of the shaft 200.

FIG. 8 shows a cross-sectioned view of the nut locking system 10. In FIG. 8, the nut 100 is secured/retained by means of the retaining ring 300, the body 302 of which is arranged in the recess 206 in the hollow section 202 of the shaft 200. The retaining ring 300 may, in addition to retaining the nut 100, further be used to secure components 400 in the hollow section 202 of the shaft 200. In FIG. 8 is the component 400 illustrated by a slip ring 400 arranged in the hollow section 202 of the shaft 200 and is being retained by the body 302 of the retaining ring 300 which protrudes from the recess 206 into the hollow section 202, thus holding the slip ring 400 in place. The component 400 may however be formed by any component 400 that is suitable for being arranged in the hollow section 202 of the shaft 200.

Figure 9:
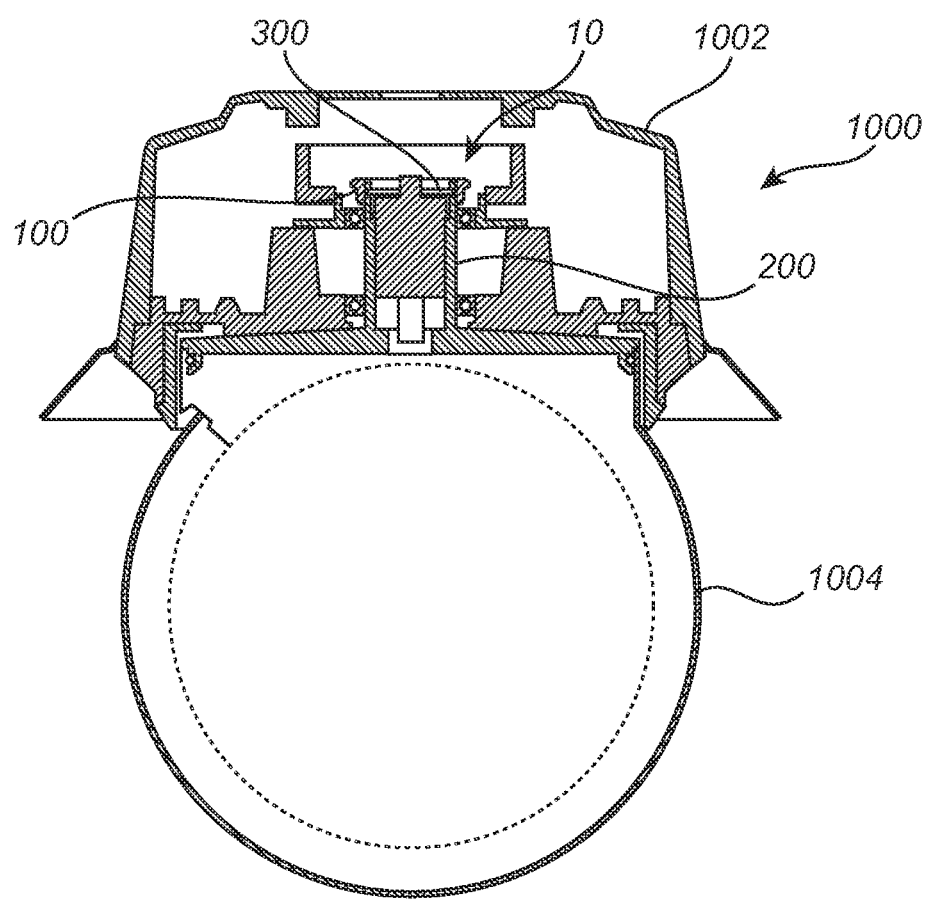
FIG. 9 discloses a cross-sectioned view of an electronic device.

Turning lastly to FIG. 9 which shows a cross-sectioned view of an electronic device 1000 comprising a nut locking system 10 according to the present disclosure. The electronic device 1000 in FIG. 9 illustrates a typical application that is particularly beneficial, other applications are however also envisioned.

The electronic device 1000 comprises a first portion 1002 and a second portion 1004. The first portion 1002 is attachable to a support and may thus form a base or housing to which the second portion 1004 attaches. The support may be a wall or ceiling of a building or any other type of structure to which the electronic device 1000 can be mounted.

The second portion 1004 preferably comprises a shaft 200 according to the teachings herein, which is rotatably attached to the first portion 1002. The nut 100 is configured to attach the second portion 1004 to the first portion 1002 such that it cannot be released therefrom without removing the nut 100. The nut locking system 10 prevents unintentional removal of the nut 100.

In a preferred embodiment, the electronic device 1000 is a camera device 1000 such as a PAN-TILT-ZOOM (PTZ) camera or a dome camera or the like. The second portion 1004 may thus be configured to be rotatable in relation to the first portion 1002.

In such an application, the electronic device 1000 may be configured to be mounted for instance for surveillance in areas where there can be high densities of people moving around and/or below the electronic device 1000, such as in retail stores or in office buildings. In such circumstances, there are strict requirements that, even if the nut 100 which holds the second portion 1004, i.e. the camera portion 1004, in place, for some reason fails or loosens from the shaft 200, the second portion 1004 must not be released from the first portion 1002. By the provision of an electronic device 1000 provided with the nut locking system 10 described herein, the risk of such an event occurring is reduced significantly, as the retaining ring 300 not only facilitates prevention of the nut 100 from unwinding from the shaft 200 but may further support the second portion 1004 in case the nut 100 for some reason fails entirely.

The nut locking system 10 provided to the electronic device 1000 not only improves the overall safety of the device 1000 but facilitates provision of improved safety whilst avoiding interference with the space required by other components of the electronic device 1000. As mentioned above, the components within electronic devices 1000 such as camera devices 1000 require electrical isolation distances to an adjacent component and additionally, it is generally desired to provide electronic devices 1000 with reduced overall size. In that context, the teachings herein facilitates providing a compact electronic device 1000 having improved safety by the provision of the secure nut locking system 10.

It will be appreciated that the present claims are not limited to the embodiments shown. Several modifications and variations are thus conceivable within the scope of the claims which thus is exclusively defined by the appended claims.

The invention claimed is:

1. A nut locking system comprising a nut, a shaft and a retaining ring, wherein the nut is connected to the shaft by means of a threaded joint, the shaft comprising a hollow section in which a body of the retaining ring is arranged, wherein the retaining ring comprises a tongue, the tongue being configured to engage the nut in response to movement of the nut relative the shaft in an axial direction thereof such that movement of the nut is restricted, wherein the tongue comprises a first tongue portion extending over an upper portion of the nut, the first tongue portion being configured to engage with the upper portion of the nut, the tongue further comprises a second tongue portion extending in the longitudinal direction of the shaft, interconnecting the body and the first tongue portion.

2. The nut locking system according to claim 1, wherein the body of the retaining ring is a split ring.

3. The nut locking system according to claim 1, wherein the body of the retaining ring is made of a resilient material.

4. The nut locking system according to claim 1, wherein the hollow section is provided with a recess receiving a section of the body of the retaining ring.

5. The nut locking system according to claim 4, wherein the recess is an annular groove.

6. The nut locking system according to claim 1, wherein the tongue comprises a third tongue portion constituting a distal end section of the tongue, wherein the third tongue portion extends in the longitudinal direction of the shaft and is configured to engage an external side surface of the nut.

7. The nut locking system according to claim 6, wherein the external side surface of the nut is provided with a groove for reception of the third tongue portion.

8. The nut locking system according to claim 1, wherein the body and the tongue of the retaining ring are integrally formed.

9. The nut locking system according to claim 1, wherein the threaded joint comprises an external thread of the shaft and an internal thread of the nut.

10. The nut locking system according to claim 1, wherein the body of the retaining ring is arranged at a distance from an end of said shaft.

11. An electronic device comprising a first portion and a second portion, the first portion being attachable to a support and the second portion being attached to the first portion by means of a nut locking system; the nut locking system comprising:
a nut, a shaft and a retaining ring, the nut being connected to the shaft by a threaded joint, the shaft comprising a hollow section in which a body of the retaining ring is arranged, the retaining ring comprising a tongue which engages the nut in response to movement of the nut relative the shaft in an axial direction thereof, such that movement of the nut is restricted, wherein the tongue comprises a first tongue portion extending over an upper portion of the nut, the first tongue portion being configured to engage with the upper portion of the nut, the tongue further comprises a second tongue portion extending in the longitudinal direction of the shaft, interconnecting the body and the first tongue portion; whereby the shaft of the nut locking system is associated with the second portion of the electronic device.

12. A camera device comprising a first portion and a camera portion, the first portion being attachable to a support and the camera portion being rotatably attached to the first portion by means of a nut locking system; the nut locking system comprising:
a nut, a shaft and a retaining ring, the nut being connected to the shaft by a threaded joint, the shaft comprising a hollow section in which a body of the retaining ring is arranged, the retaining ring comprising a tongue which engages the nut in response to movement of the nut relative the shaft in an axial direction thereof, such that movement of the nut is restricted, wherein the tongue comprises a first tongue portion extending over an upper portion of the nut, the first tongue portion being configured to engage with the upper portion of the nut, the tongue further comprises a second tongue portion extending in the longitudinal direction of the shaft, interconnecting the body and the first tongue portion; whereby the shaft of the nut locking system is associated with the second camera portion of the electronic device.

* * * * *